United States Patent
Virella (10) Patent No.: US 10,742,062 B2
(45) Date of Patent: Aug. 11, 2020

(54) ELECTROMAGNETIC ELECTRICITY GENERATOR

(71) Applicant: Eddie Oquendo Virella, Norwich, CT (US)

(72) Inventor: Eddie Oquendo Virella, Norwich, CT (US)

(*) Notice: Subject to any disclaimer, the term of this patent is extended or adjusted under 35 U.S.C. 154(b) by 0 days.

(21) Appl. No.: 16/154,092

(22) Filed: Oct. 8, 2018

(65) Prior Publication Data

US 2019/0052118 A1    Feb. 14, 2019

Related U.S. Application Data

(63) Continuation of application No. 14/753,755, filed on Jun. 29, 2015, now Pat. No. 10,097,028.

(60) Provisional application No. 62/018,826, filed on Jun. 30, 2014.

(51) Int. Cl.
| | |
|---|---|
| *H02J 7/02* | (2016.01) |
| *H02J 7/14* | (2006.01) |
| *H02J 50/20* | (2016.01) |
| *H02K 53/00* | (2006.01) |
| *H02J 3/32* | (2006.01) |
| *H02J 3/38* | (2006.01) |
| *H02J 7/00* | (2006.01) |

(52) U.S. Cl.
CPC ............ *H02J 7/025* (2013.01); *H02J 7/1415* (2013.01); *H02J 50/20* (2016.02); *H02K 53/00* (2013.01); *H02J 3/32* (2013.01); *H02J 3/381* (2013.01); *H02J 7/0022* (2013.01); *H02J 7/0026* (2013.01)

(58) Field of Classification Search
CPC .......... H02J 7/025; H02J 50/20; H02J 7/1415; H02J 7/0022; H02J 7/0026; H02J 3/381; H02J 3/32; H02K 53/00
USPC ......................................................... 310/52
See application file for complete search history.

(56) References Cited

U.S. PATENT DOCUMENTS

| | | | |
|---|---|---|---|
| 6,624,542 B1 | 9/2003 | Gabrys et al. | |
| 10,097,028 B2* | 10/2018 | Virella | H02K 53/00 |
| 2010/0006356 A1 | 1/2010 | Curry et al. | |
| 2010/0044123 A1* | 2/2010 | Perlman | H02J 50/90 |
| | | | 180/2.1 |
| 2013/0009476 A1 | 1/2013 | Solis et al. | |
| 2013/0057118 A1 | 3/2013 | Benkert et al. | |
| 2014/0152016 A1* | 6/2014 | Jennings | F03G 7/08 |
| | | | 290/55 |
| 2014/0210321 A1 | 7/2014 | Dixon et al. | |
| 2014/0312722 A1 | 10/2014 | Raad | |

(Continued)

FOREIGN PATENT DOCUMENTS

WO    WO 2014/040172 A1    3/2014

*Primary Examiner* — Forrest M Phillips
(74) *Attorney, Agent, or Firm* — Foley & Lardner LLP (57) ABSTRACT

An electromagnetic generator comprising an antenna that receives radiofrequency energy. The antenna is connected to a rectifier circuit, which is used to charge a first battery using the radiofrequency energy received by the antenna. The first battery supplies power to a control unit, which powers at least one electromagnet to generate a magnetic field. A flywheel having at least one magnet is configured to rotate when the magnetic field is generated. An alternator, connected to the flywheel, charges a second battery based on the rotation of the flywheel. The second battery is then used to supply power to an external device.

20 Claims, 6 Drawing Sheets

(56) References Cited

U.S. PATENT DOCUMENTS

2014/0354243 A1 12/2014 Oelofse
2016/0214494 A1 7/2016 Saavedra

* cited by examiner

ELECTROMAGNETIC ELECTRICITY GENERATOR

CROSS-REFERENCE TO RELATED APPLICATIONS

This application claims the benefit of and priority from U.S. Provisional Application No. 62/018,826, filed Jun. 30, 2014, which is herein incorporated by reference in its entirety and for all purposes.

FIELD

The disclosure relates generally to electromagnetic generators, in particular, electromagnetic generators that utilize radiofrequency signals as an energy input.

BACKGROUND

Consumers rely on electricity to power various devices and appliances used on a daily basis. For example, electricity is used to charge cell phones, power televisions, heat water, propel cars, cook food, and the like. Electricity is a critical component to everyday life. Consumers typically receive electricity in one of two ways: (1) from a utility company or (2) from an electric generator.

Often, utility companies rely on large-scale electric generators to create electricity in a similar manner to smaller-scale electric generators used by individuals. Electric generators are devices that convert one form of energy (e.g., mechanical energy) into electrical energy (i.e., electricity), which can be used to power external devices or can be stored in storage devices, such as batteries and capacitors, for later use. For example, some electric generators use mechanical energy input to turn or rotate permanent magnets. The rotating permanent magnets create changing magnetic fields, which react with conductors to drive an electric current. Accordingly, at least a portion of the input mechanical energy is converted into usable electric energy (i.e., electricity). The input mechanical energy may be provided manually (e.g., via a hand crank), provided from the output of an internal combustion engine, provided from a steam driven turbine (e.g., as done in a nuclear or fossil fuel power plant), or the like.

Large amounts of input mechanical energy are typically required to generate a meaningful amount of electricity. This often requires paying a utility company for a portion of the electricity generated by the utility company or the burning of fossil fuels in an internal combustion engine driven personal generator. Electricity generated by utility companies can be expensive. Additionally, the burning of fossil fuels can be expensive and produces potentially harmful byproducts, such as carbon dioxide, carbon monoxide, sulfur, and the like. Accordingly, improved electricity sources are desired.

SUMMARY

One embodiment of the present invention relates to an electromagnetic generator comprising an antenna configured to receive radiofrequency energy and a first circuit connected to the antenna and configured to charge a first battery using the radiofrequency energy received by the antenna. A control unit is configured to receive power from the first battery and is further configured to power at least one electromagnet to generate a magnetic field. A rotatable body having at least one magnet is configured to rotate when the magnetic field is generated. A second circuit is connected to the rotatable body and configured to supply power to an external device.

Another embodiment relates to a method for supplying power using radiofrequency energy. The method includes receiving radio waves through an antenna and converting energy from the radio waves to a first current. The first current is used charge a first battery. At least one electromagnet is powered to produce a magnetic field using energy supplied from the first battery. The method further includes rotating a rotatable body due to the magnetic field produced by the at least one electromagnet and converting energy produced by the rotation of the rotatable body to a second current. The second current is used to power an external device.

A further embodiment relates to an electromagnetic generator. The generator includes an antenna configured to receive radiofrequency energy. The generator further includes a rectifier circuit connected to the antenna and configured convert the radiofrequency energy to direct current energy used to charge a first battery. The generator includes a control unit configured to receive power from the first battery and further configured to power at least one electromagnet to generate a magnetic field. The generator further includes a flywheel having at least one magnet and configured to rotate when the magnetic field is generated. The generator includes an alternator mechanically connected to the flywheel and configured to charge a second battery based on the rotation of the flywheel. The second battery is configured to supply power to an external device.

BRIEF DESCRIPTION OF THE FIGURES

Features, aspects, and advantages of the present invention will become apparent from the following description and the accompanying exemplary embodiments shown in the drawings, which are briefly described below.

DETAILED DESCRIPTION

Referring to the figures generally, systems and methods for generating usable quantities of electricity from radio waves via an electromagnetic electricity generator are described. Radio waves are electromagnetic waves that are emitted and received by many different types of devices. Each radio wave contains electromagnetic energy that can be converted into usable electricity through the described electromagnetic electricity generator. The electromagnetic electricity generator utilizes an antenna to receive the radio wave and a rectifier circuit to convert the electromagnetic electricity generator into an electric current. The electric current is used to drive a magnetic flywheel, which generates mechanical energy. The mechanical energy is then converted into electricity, which can be used to charge batteries and/or power devices. The radio waves received by the antenna can be generated from a remote power company or may be scavenged from the ambient environment (e.g., from television broadcasts, radio broadcasts, cellular phone base stations, wireless networking devices, etc.).

Figure 1:
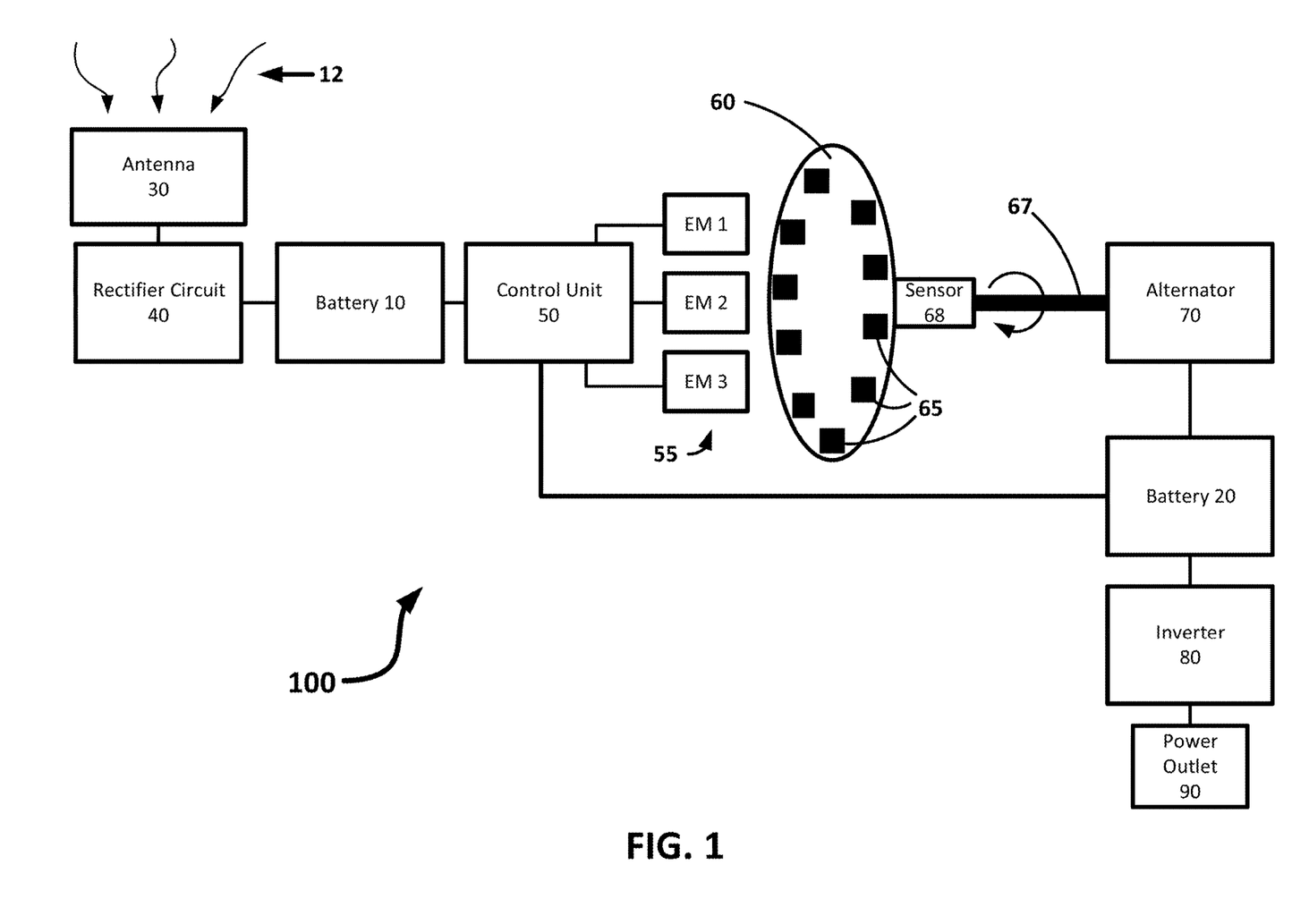
FIG. 1 shows a schematic diagram of an exemplary embodiment of an electromagnetic generator of the present invention.

FIG. 1 schematically shows an electromagnetic generator 100 according to an exemplary embodiment. The electromagnetic generator 100 includes an antenna 30 connected to a rectifier circuit 40. The antenna 30 is configured to receive radio waves 12 from the ambient environment. In some arrangements, the received radio waves have a frequency of approximately 945 MHz. The radio waves 12 generate an alternating current (AC) in the antenna 30. The radio waves 12 may originate from a dedicated radio wave generation plant (e.g., a utility company) or may be scavenged from the ambient environment (e.g., from television broadcast transmitters, radio broadcast transmitters, cellular phone base stations, wireless networking devices, etc.).

The generated AC power is then provided from the antenna 30 to the rectifier circuit 40, which converts the AC power into direct current (DC). This DC power is used to charge a first battery 10. The first battery 10 is a rechargeable battery. Accordingly, the first battery 10 may be any of a nickel cadmium (NiCd) battery, a nickel metal hydride (NiMH) battery, a lithium ion (LiIon) battery, a sealed lead acid (SLA) battery, or the like. The first battery 10 may include a plurality of individual battery cells. In some arrangements, the first battery 10 includes a charging controller that controls the input of DC power into the first battery 10 to prevent damage to the first battery 10 that may result from overcharging and/or overheating. Because the generator 100 continuously receives radio waves 12 through the antenna 30 and continuously converts the electromagnetic energy of the received radio waves 12 into DC power, the first battery 10 can be continuously charged over time (e.g., trickle charged). The first battery 10 is not limited to a single battery. Alternatively, the first battery 10 may comprise a plurality of batteries. In such arrangements, once one battery of the plurality of batteries is sufficiently charged, other batteries may be charged by the received DC power from the rectifier circuit 40. This allows for additional storage of electric energy from the radio waves 12.

Once the first battery 10 is sufficiently charged, the battery 10 is then used to supply electric power to a control unit 50. The control unit 50 controls a plurality of electromagnets 55. Although three electromagnets 55 are shown in FIG. 1, it should be understood that any number of electromagnets 55 may be utilized by the generator 100. The control unit 50 includes a power input that receives electric power from the first battery 10. The control unit 50 includes a processor and memory. The memory stores programming modules that, when executed by the processor, control the operation of the control unit 50 as described in further detail below. The electromagnets 55 are mounted adjacent to a flywheel 60 that has a plurality of permanent magnets 65 affixed thereon. The permanent magnets 65 are positioned about a circumference of the flywheel. The electromagnets 55 are aligned such that the electromagnets 55 project a magnetic field over at least a portion of the flywheel 60 when the electromagnets are powered. In arrangements where a plurality of electromagnetics 55 are utilized by the generator 100, each of the electromagnets can have a different position with respect to the flywheel 60. For example, the electromagnets 55 may be positioned around the circumference of the flywheel 60. Moreover, each of the electromagnets 55 may be further configured to produce different magnetic field strengths with respect to each one another. The flywheel 60 is a cylinder that has a diameter that is significantly larger than its axial length. In some arrangements, the diameter of the flywheel 60 is at least ten times the axial length of the flywheel 60.

The flywheel 60 is rotationally coupled to an axle 67. The axle 67 extends along a central axis of the flywheel 60. Accordingly, when the flywheel 60 rotates, the axle 67 rotates with the same rotational velocity as the flywheel 60. The axle 67 is connected to an alternator 70. When the flywheel 60 rotates, the axle 67 rotates and provides rotational mechanical energy into the alternator 70. The alternator 70 is an electromechanical device that converts rotational mechanical energy into electricity.

During operation, the control unit 50 selectively and independently powers each of the electromagnets 55 to generate magnetic fields. The magnetic fields interact with the permanent magnets 65 positioned on the flywheel 60, which causes the flywheel 60 to spin. In some operating conditions, the control unit 50 will cause the magnetic field generated by a given electromagnet to be of the same polarity as the permanent magnets 65 to repel the permanent magnets 65. In other operating conditions, the control unit 50 will cause the magnetic field generated by a given electromagnet to be of the opposite polarity as the permanent magnets 65 to attract the permanent magnets 65. The control unit 50 determines when to power each of the electromagnets 55, the amount of power to provide to each electromagnet 55 when powered on, the polarity of the magnetic field to be generated, the strength of the magnetic field to be generated, and when to turn off each electromagnet 55 based on at least in part on feedback from a position and speed sensor 68. The position and speed sensor 68 measures the position and rotational speed of either the flywheel 60 or the axle 67. By selectively and independently powering each of the electromagnets 55, the control unit 50 can accelerate the flywheel 60 to a high rotational speed (e.g., above 1000 RPM) and maintain the high rotational speed of the flywheel 60. The flywheel 60 may be mounted to a low friction bearing such that little energy input is needed to maintain the rotational speed of the flywheel 60.

The spinning of the flywheel 60 produces rotational mechanical energy. The rotational mechanical energy is transferred from the flywheel 60 to the alternator 70 via the axle 67. The alternator 70 converts the mechanical energy into DC power. The DC power output by the alternator 70 is then used to charge a second battery 20. The second battery 20 is a rechargeable battery. Accordingly, the second battery 20 may be any of a NiCd battery, a NiMH battery, a LiIon battery, a SLA battery, or the like. The second battery 20 may include a plurality of individual battery cells. In some arrangements, the second battery 20 includes a charging controller that controls the input of DC power into the second battery 20 to prevent damage to the second battery 20 that may result from overcharging and/or overheating. The charging controller may provide feedback to the control unit 50 to indicate a charge of the second battery 20. For example, the charging controller may provide a voltage of the second battery 20 to the control unit 50. Based on the feedback provided to the control unit 50, can stop powering the flywheel 60 or accelerate the flywheel 60. The second battery 20 stores the power until it is needed. As described above with the first battery 10, the second battery 20 may also comprise a plurality of batteries. These batteries may also be continuously and/or alternately charged and discharged to store and provide power, allowing for an increase in capacity of the generator 100.

The power stored by the second battery 20 is then sent to a power inverter 80, which converts the DC power supplied by the second battery into AC power. The AC power is output from the generator. In some arrangements, the AC power is supplied to a power outlet 90 to supply power to external devices when needed. In other arrangements, the AC power is provided to a power system (e.g., for a building) or to a power grid (e.g., a power grid that supplies a plurality of buildings and devices). In an alternative arrangement, the power inverter 80 is bypassed and DC power is output from the generator 100 (e.g., to power a device via a USB port).

Figure 2:
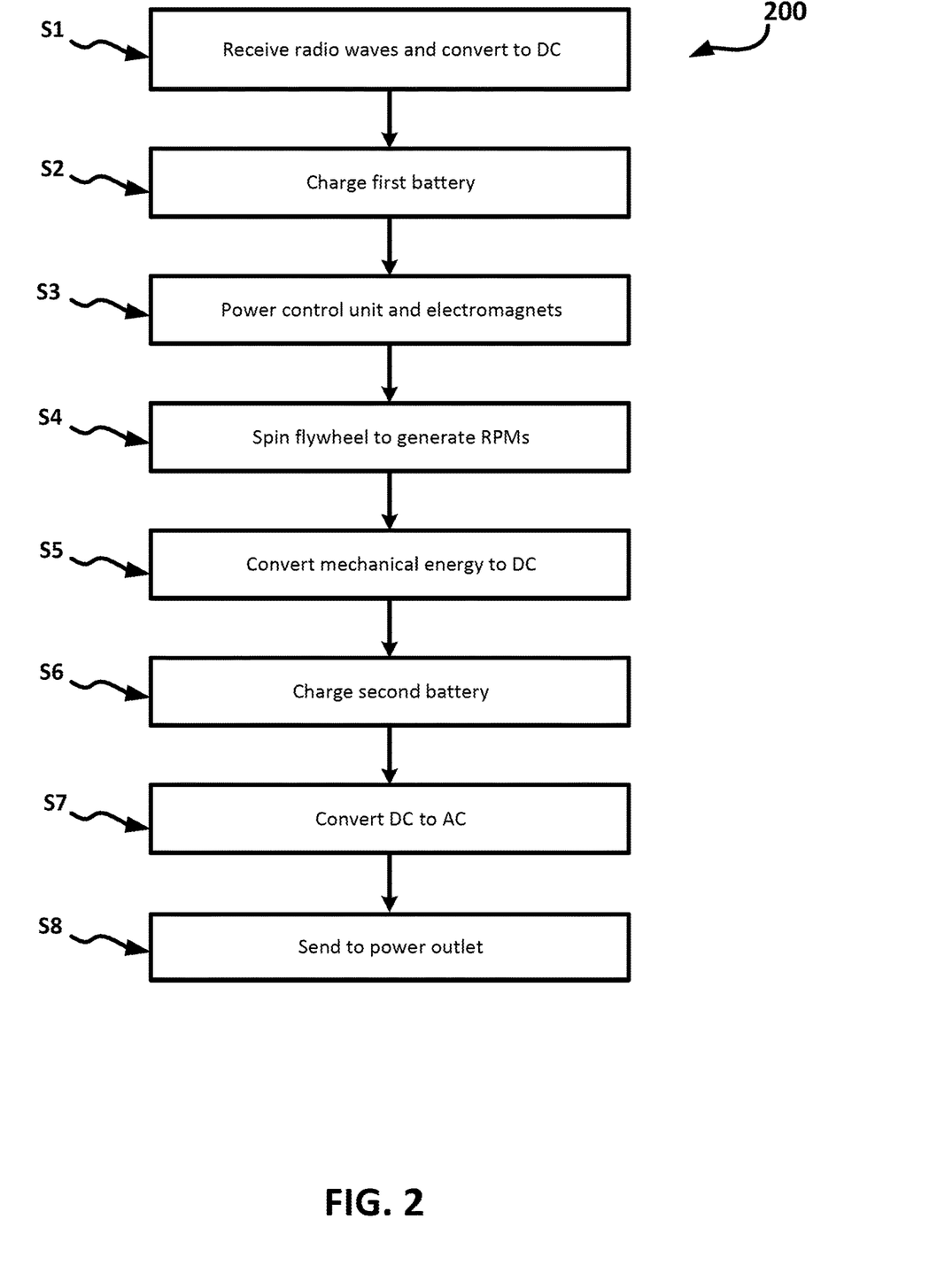
FIG. 2 shows a flow chart illustrating a process in which radiofrequency energy is utilized in order to charge a battery to power devices.

FIG. 2 illustrates a flow chart of a method 200 of converting radiofrequency energy into electricity according to an exemplary embodiment. Method 200 is performed by the generator 100 as described above with respect to FIG. 1. In step S1, radio waves 12 are received by the antenna 30 and converted to DC power by the rectifier circuit 40. The DC power is then used to charge the first battery 10 in step S2. At step S3, the energy stored on the first battery 10 is used to power the control unit 50 and the electromagnets 55. As described above, the control unit 50 selectively and independently activates and deactivates each electromagnet to generate magnetic fields. The magnetic fields interact with the permanent magnets 65 mounted on the flywheel 60, which cause the flywheel 60 to rotate at step S4. At step S5, the rotational mechanical energy of the flywheel 60 is transferred to the axle 67, and is provided to the alternator 70, which converts the received mechanical energy into DC power. The DC power is then output to the second battery 20 at step S6. The second battery 20 stores the electric energy until needed. When power is needed, it is first converted from DC to AC by the inverter 80 at step S7. The AC power is then outputted from the generator 100 at step S8. In some arrangements, the AC power is supplied to a power outlet 90 to supply power to external devices when needed. In other arrangements, the AC power is provided to a power system (e.g., for a building) or to a power grid (e.g., a power grid that supplies a plurality of buildings and devices). In an alternative arrangement, step s7 is bypassed (e.g., the power inverter 80 is bypassed) and DC power is output from the generator 100 (e.g., to power a device via a USB port).

Figure 3:
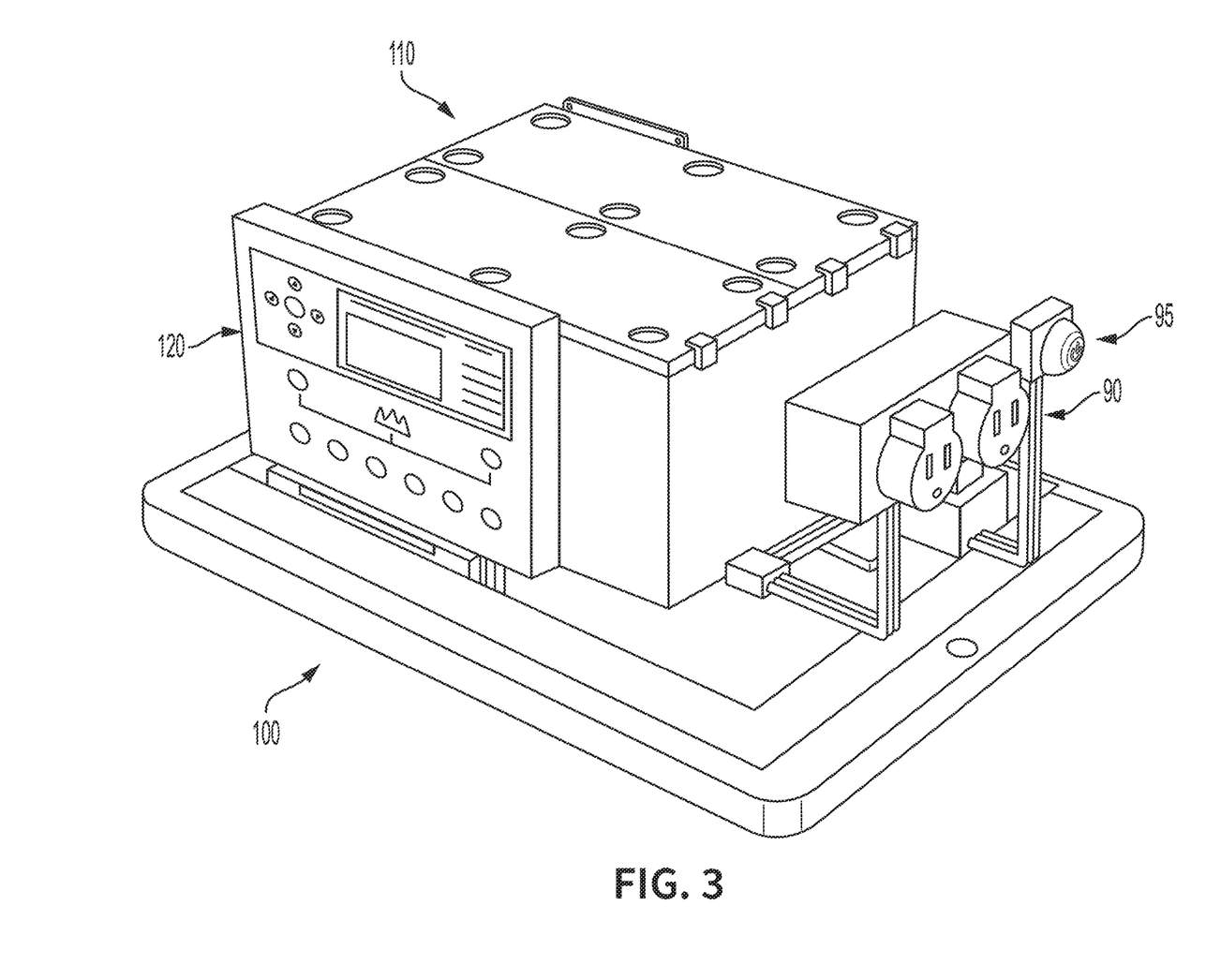
FIG. 3 shows a perspective front view of the electromagnetic generator.
Figure 4:
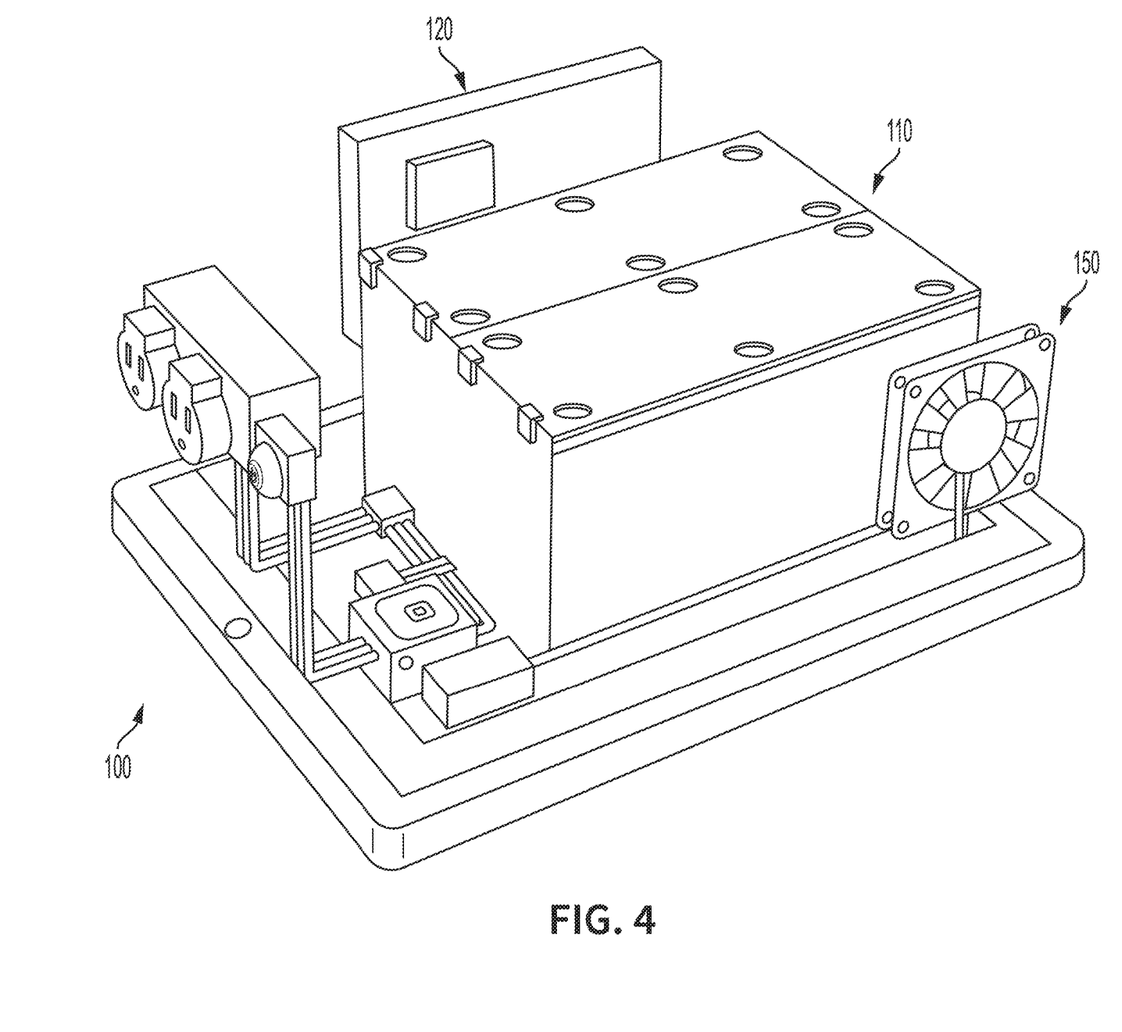
FIG. 4 shows a perspective back view of the electromagnetic generator.
Figure 5A:
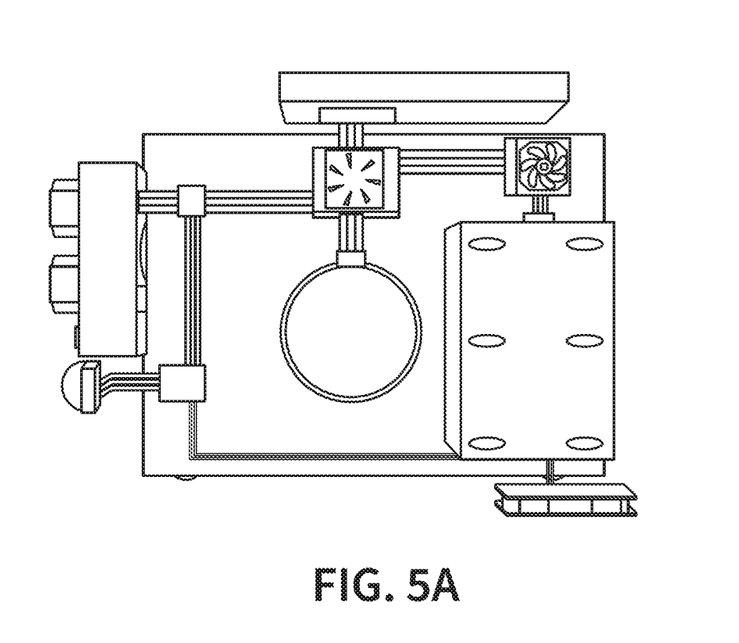
FIGS. 5A-5D shows a perspective views of additional embodiments of the electromagnetic generator.
Figure 5B:
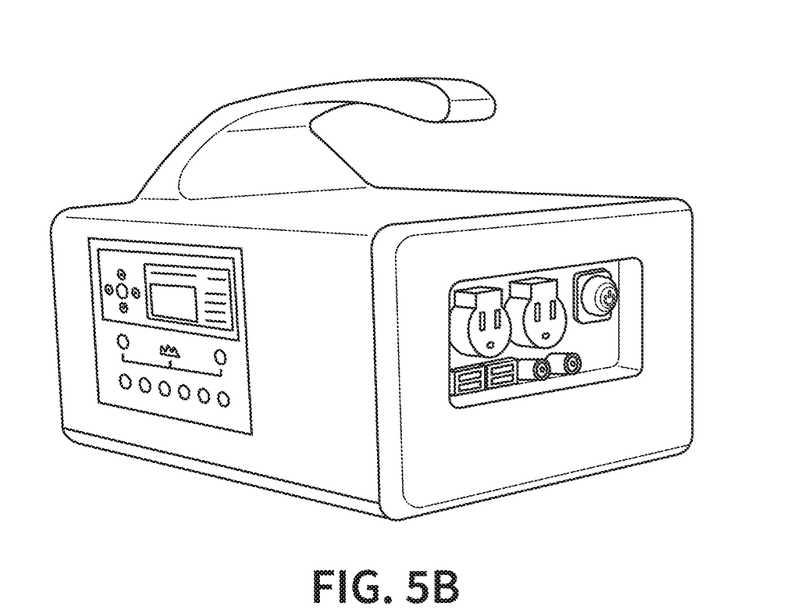
Figure 5C:
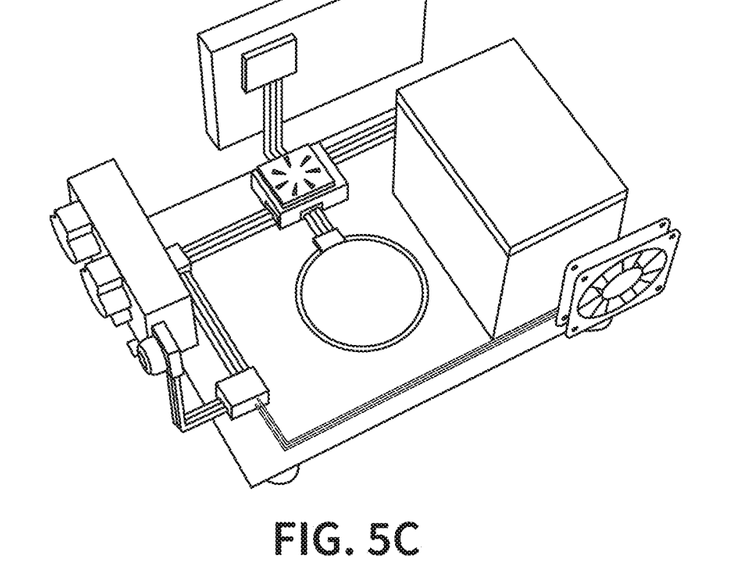
Figure 5D:
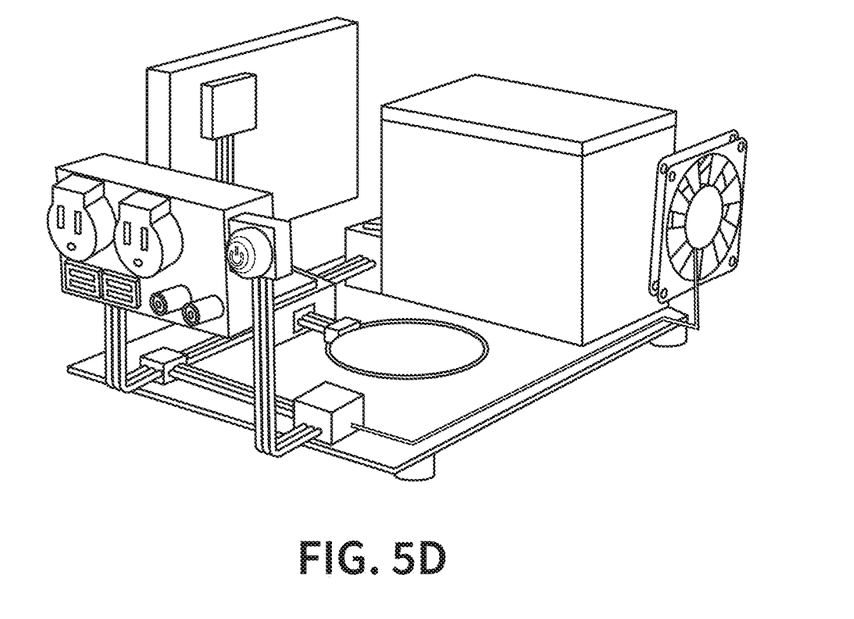

FIGS. 3 and 4 illustrate perspective front and back views of one embodiment of the electromagnetic generator 100. The components described above are preferably housed in a case 110 of the generator 100. As shown in FIGS. 3 and 4, the generator 100 may include a control panel 120. The control panel 120 may comprise indicator lights that may indicate to the user the current state of the generator 100 and/or the storage levels of the batteries. The control panel 120 may also indicate to the user other measurements of the system, such as current input or output levels. As shown in FIG. 3, the generator 100 may also include a power switch 95 to send energy stored in the second battery 20 to the power outlet 90 when required. As shown in FIG. 4, the generator 100 may further include a cooling system 150, such as a fan, to prevent overheating of the system. FIGS. 5A-5D illustrate perspective views of an additional embodiment of the electromagnetic generator 100, with an alternative case and component design.

The above-described generator 100 may include additional features. For example, the generator 100 may include an integrated cooling system that cools the various components (e.g., the first battery 10, the second battery 20, the control unit 50, etc.) to prevent overheating. The cooling system may be a liquid cooling system or an air cooling system. The generator 100 may include a passive voltage control system and an electrical and a fuse system to prevent any overload problem. In some arrangements, a gearbox is coupled between the rotating axle 67 and the alternator 70 to modify the torque and rotational speed input into the alternator 70.

In some arrangements, the above-described generator 100 is distributed by a power delivery company. In such arrangements, the power delivery company may distribute generators to its subscribers. The power delivery company generates wireless signals (e.g., from a transmitter tower). Each generator may have an identifier associated with each subscriber. The identifier can be communicated wirelessly (e.g., through radio-frequency identification, Bluetooth, WiFi, etc.). Alternatively, the identifier may be associated with the entry of a specific user ID into the control panel 120 (e.g., user ID and password, user PIN, etc.). Each generator also includes a data transceiver (e.g., a cellular data transceiver) that provides real-time feedback to the power delivery company relating to an amount of electricity consumed by the associated subscriber. The power delivery company can then accurately bill each of its subscribers for actual electricity used.

The above-described generator 100 may be adapted to power specific devices. For example, the generator 100 may be integrated into and provide operational power to tools, such as powered gardening equipment (e.g., lawn mowers, weed whackers, electric tree trimmers, etc.), tools (e.g., air compressors, power washers, saws, drills, etc.), hospital equipment to provide off-grid power backup, vehicles or other propulsion systems (e.g., electric motor boats, electric aircraft, electric automobiles, electric motorbikes, etc.), appliances and HVAC equipment (e.g., refrigeration systems, heating systems, clothes washers, clothes dryers, etc.), commercial construction equipment, and the like. The generator 100 may be used as a replacement for traditional fossil fuel based electricity generators, such as diesel or gasoline generators. Furthermore, the generator 100 is not limited in its use of radiofrequency signals from transmission towers. The generator 100 may alternatively be used in space systems, utilizing radiofrequency energy present in space communications.

The above-described generator 100 may also be used in combination with other power-transmitting devices. For example, the generator 100 may be used together with a traditional gas engine, electric motor, or a hybrid engine. The generator 100 may also be used in combination with other forms of alternative energy, such as solar power, wind power, or hydropower.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The use of the term "approximately" in relation to numbers, values, and ranges thereof refers to plus or minus five percent of the stated of numbers, values, and ranges thereof.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments, and elements from different embodiments may be combined in a manner understood to one of ordinary skill in the art. Other substitutions, modifications, changes and omissions may also be made in the design, operating conditions and arrangement of the various exemplary embodiments without departing from the scope of the present invention.

What is claimed is:

1. An electromagnetic generator comprising:
   an antenna configured to receive radiofrequency energy;
   a first circuit connected to the antenna and configured to charge a first battery using the radiofrequency energy received by the antenna;
   a control unit comprising a processor, the control unit configured to receive power from the first battery and further configured to power at least one electromagnet to generate a magnetic field, the control circuit, via programming modules executable by the processors, is programmed to selectively and independently activate and deactivate the at least one electromagnet; and
   a rotatable body having at least one magnet and configured to rotate when the magnetic field is generated.

2. The electromagnetic generator of claim 1, further comprising a second battery, wherein a second circuit is further configured to charge the second battery based on the rotation of the rotatable body.

3. The electromagnetic generator of claim 2, wherein the second battery is configured to supply power to the external device.

4. The electromagnetic generator of claim 1, wherein the rotatable body is a flywheel.

5. The electromagnetic generator of claim 1, wherein the first circuit is a rectifier.

6. The electromagnetic generator of claim 1, further comprising a second circuit that is an alternator.

7. The electromagnetic generator of claim 1, wherein the first battery comprises at least two batteries.

8. The electromagnetic generator of claim 2, wherein the second battery comprises at least two batteries.

9. The electromagnetic generator of claim 1, comprising three electromagnets.

10. The electromagnetic generator of claim 9, wherein the three electromagnets are each configured to have different magnetic field strengths.

11. The electromagnetic generator of claim 1, further comprising a cooling system.

12. The electromagnetic generator of claim 1, further comprising a control panel configured to indicate to a user charging levels of the first battery and the second battery.

13. A method for supplying power using radiofrequency energy, comprising:
    receiving radio waves through an antenna;
    converting energy from the radio waves to a first current;
    using the first current to charge a first battery;
    powering at least one electromagnet to produce a magnetic field using energy supplied from the first battery and selectively and independently activate and deactivate the at least one electromagnet;
    rotating a rotatable body due to the magnetic field produced by the at least one electromagnet; and
    converting energy produced by the rotation of the rotatable body to a second current.

14. The method of claim 13, further comprising the steps of using the second current to charge a second battery and powering an external device using energy supplied from the second battery.

15. The method of claim 13, wherein the first battery is a plurality of batteries.

16. The method of claim 13, wherein the rotatable body is a flywheel.

17. The method of claim 13, wherein the first current is a direct current.

18. The method of claim 13, wherein the second current is an alternating current.

19. The method of claim 14, wherein the second current is a direct current.

20. An electromagnetic generator comprising:
    an antenna configured to receive radiofrequency energy;
    a rectifier circuit connected to the antenna and configured convert the radiofrequency energy to direct current energy used to charge a first battery;
    a control unit comprising a processor, the control unit configured to receive power from the first battery and further configured to power at least one electromagnet to generate a magnetic field and selectively and independently activate and deactivate the at least one electromagnet;
    a flywheel having at least one magnet and configured to rotate when the magnetic field is generated; and
    an alternator mechanically connected to the flywheel and configured to charge a second battery based on the rotation of the flywheel.

* * * * *